United States Patent [19]

Finger et al.

[11] Patent Number: 4,499,538
[45] Date of Patent: Feb. 12, 1985

[54] ACCESS ARBITRATION SYSTEM TO SEVERAL PROCESSORS OR MICROPROCESSORS WITH A COMMON BUS

[76] Inventors: Ulrich Finger, 30, rue du Moulin de Pierre, 92140 Clamart; Pierre Desprez, 50, Ave. A. Briand, 92220 Bagneux; Pierre Ligneres, 80 bis, Rue des Mures, 92160 Antony, all of France

[21] Appl. No.: 414,591

[22] Filed: Sep. 3, 1982

[30] Foreign Application Priority Data

Sep. 24, 1981 [FR] France ............................ 81 18014

[51] Int. Cl.³ .................................. G06F 15/16
[52] U.S. Cl. .................................. 364/200
[58] Field of Search .............. 364/200 MS File; 340/825.5

[56] References Cited

U.S. PATENT DOCUMENTS

3,798,591  3/1974  Phillips et al. ................ 364/200
4,237,534  12/1980  Felix ............................ 364/200

FOREIGN PATENT DOCUMENTS

32864  1/1981  European Pat. Off.

OTHER PUBLICATIONS

Nadir et al.: "Bus Arbiter Streamlines Multiprocessor Design", pp. 103–109, Computer Design, vol. 19, No. 6, Jun. 1980 Concord (US).
W. W. Plummer: "Asynchronous Arbiters", pp. 37–42; IEEE Transactions on Computers, vol. C-21, No. 1, Jan. 1972.
M. Courvoisier et al: "A self-testing arbiter circuit for multimicrocomputer systems", pp. 281-283, Digest of Papers, FTCS-10, The 10th International Symposium on Fault-Tolerant Computing, Kyoto, Japan, Oct. 1-3, 1980, The Institute of Electrical and Electronics Engineers, Inc.
Durham: "Fast LSI arbiters supervise priorities for bus-access in multiprocessor systems", pp. 128-133, Electronic Design, vol. 11, May 24, 1979, Rochelle Park (US).

*Primary Examiner*—Raulfe B. Zache

[57] ABSTRACT

The invention relates to an access system to several processors having common resources by means of a common bus.

For each processor this system comprises an arbitration means for access request conflicts. The arbitration means comprises access request processing means connected to the bus and to the processor and an access priority resolution circuit connected to the bus, to the access request processing means and to the processor. The resolution circuit is able to allocate mixed, cyclic or mixed fixed and cyclic priorities to the access requests.

Application to the management of access requests for processors or microprocessors having common resources, such as memories.

9 Claims, 7 Drawing Figures

4,499,538

ACCESS ARBITRATION SYSTEM TO SEVERAL PROCESSORS OR MICROPROCESSORS WITH A COMMON BUS

BACKGROUND OF THE INVENTION

The present invention relates to an access arbitration system to several processors or microprocessors having a common bus. The invention is applied more particularly to the management of the accesses to several microprocessors or processors having common resources, such as e.g. memories.

In the processor field, an important problem which has been solved in a more or less satisfactory manner, is that of access by several processors to common resources by means of a common bus. This problem has become increasingly important with the event of microprocessors because, in view of their relatively high power, cost and greater overall dimensions, it is of greater importance to design multiprocessor systems and to give them access to common resources by means of a common bus.

It is known that this type of access requires an arbitration, as a function of the priority criteria of the access requests made by the processors. It is also known to operate a multiprocessor system in either a synchronous or an asynchronous manner.

In a multiprocessor system operating in a synchronous manner, all the processors are controlled by the same clock. In this type of system, the length of the buses giving access to the common resources via a common bus is an important parameter because the different multiprocessors must function in a synchronous manner and the length of the buses acts on the synchronism. Another problem involved in the design of a multiprocessor system with a common clock is that of phase lags to the common clock during pulse paths thereof in the different buses and circuits. The main disadvantage of such synchronous systems is that the system availability is closely linked with the common clock cycle.

In multiprocessor systems where the processors operate in an asynchronous manner, synchronization thereof only occurs during accesses to the common resources. In an asynchronous system, it is possible to add a processor to the existing system without having to modify the algorithms controlling the arbitration of the access requests of the various processors having a common bus. Thus, asynchronous multiprocessor systems have important advantages compared with synchronous systems.

Apart from the fact that multiprocessor systems can operate either synchronously or asynchronously, another essential difference between these different systems is in the arbitration systems for the access request of the different processors to common resources, by means of a common bus. Among the different arbitration systems which can be used, it is necessary to distinguish between "series" arbitration systems and "parallel" arbitration systems.

In series arbitration systems, each processor comprises an arbitration circuit, whose output is connected to the input of the immediately lower priority arbitration circuit. Thus, the different arbitration circuits are connected in line and these systems require the use of a clock, which manages the access requests of the different processors with a common bus and which also manages the results of the bus of the operations carried out by the different processors. Thus, the number of processors which can be grouped by using series arbitration systems is dependent on the frequency of the common clock and the time lags introduced into the multiprocessor system by the priority operations carried out by the arbitration systems. With the present state of the art, a clock supplying pulses at a frequency of 10 MHz can only control arbitration systems in a three processor system. Moreover, in this type of arbitration, the priority is dependent on the position of each arbitration system in the line of processors, so that the processor located at the end of the line does not function under very favourable conditions.

Parallel arbitration systems make it possible to connect a larger number of processors to a common bus to give access to common resources. In these systems, each processor has a bus access request line and a line making it possible to supply the arbitration result. Often other control lines are added to the aforementioned lines in order to give the state of the arbitration system (occupied, urgent).

Finally, in multiprocessor systems, the priorities can be treated in different ways and can be fixed, cyclic sequential or both fixed and cyclic sequential.

The actual arbitration systems can be centrallized or decentralized. A centralized arbitration system is attached to a group of processors, whilst a decentralized arbitration system is attached to each processor. A centralized system requires fewer circuits than a decentralized system, but its availability determines the availability of the multiprocessor system.

At present it would seem that the choice of the organization of a multiprocessor system is moving towards parallel arbitration systems with a fixed priority for reasons of speed, whilst the choice is moving towards arbitration systems with a series priority for reasons of simplicity. Arbitration systems for access requests to a common bus in a multiprocessor structure use both series arbitration and parallel arbitration.

In a more general manner, the arbitration systems described hereinbefore have the following disadvantages. The series arbitration system requires the use of a very fast clock to permit the connection of several processors and this leads to the development of very rapid switching components in order to make it possible to transmit on a bus signals, whose frequency is above 10 MHz. Moreover, the fixed priority of these systems leads to programming constraints for the different processors, so that the lowest priority processor may never have access to the bus. In certain multiprocessor systems, the data are transferred by blocks. The access of a processor to a common bus in this case requires the time of several exchanges with the memory, so that such systems are very costly for giving access to a memory word.

In most cases parallel arbitration systems are centralized and consequently have a limited availability. In this case the priority is often fixed in order to reduce the complexity of the arbitration system.

In general terms all the known arbitration circuits work with a clock making it possible to obviate conflicts. The presence of this clock requires a supplementary synchronization time for the different processors thereon (this time being dependent on the clock frequency). Moreover, the different processors are dependent on the clock for all availability problems.

None of the existing systems makes it possible to obtain a mixed arbitration (mixture of fixed and cyclic priorities). Finally, at present in multiprocessor systems there is no circuit permitting a supervision of the arbitration systems in such a way as to switch from one arbitration system to the other if one of them fails.

BRIEF SUMMARY OF THE INVENTION

The object of the invention is to obviate these disadvantages and in particular provide an arbitration system for access requests to several processors or microprocessors with common resources by means of a common bus. This system makes it possible to manage the arbitration of the access requests to a common bus in an asynchronous multiprocessor system, in order to obviate the disadvantages of the aforementioned synchronous systems. In the system according to the invention, there is a parallel arbitration of the access requests, with the possibility of a fixed priority, cyclic sequential priority or mixed priority. Arbitration is decentralized in order to give greater flexibility to the system, which then makes it possible to satisfy access requests from a large number of processors or microprocessors in a very short time (approximately 100 nanoseconds). This arbitration is asynchronous, without a common clock and independent of the type of microprocessor connected to the bus. These different aims can be achieved as a result of the two embodiments of the system according to the invention. In a first embodiment a fusible PROM memory is used which, in per se known manner, makes it possible to encode all the possibile priority combinations (fixed, cyclic or mixed). In a second embodiment, the combinations of priorities are obtained by coding and scrambling circuits which, as will be shown hereinafter, make it possible to produce the system in the form of an integrated circuit in a standard case. This system also comprises a supervision system making it possible to switch from one arbitration system to another if one of them fails. This very simple system also permits a cyclic priority operation, without it being necessary to call on queues, i.e. of the FIFO type.

The present invention therefore relates to an arbitration system for access requests to several processors having common resources by means of a common bus, wherein it comprises for each processor an arbitration means for access request conflicts, said arbitration means comprising means for processing access requests connected to the bus and to the processor, and a resolution circuit for the access priorities connected to the bus, to the access request processing means and to the processor, said resolution circuit being able to allocate to the access requests fixed priorities, cyclic priorities or mixed fixed and cyclic priorities. In addition, according to the invention the means for processing the access requests comprise a bus access request circuit receiving a signal indicating an access request of the corresponding processor to the arbitration means in question, as well as a signal indicating whether the other processors have made an access request, and a circuit for transmitting a signal representing the access request arbitration verdict of the corresponding processor, as a function of the priorities of the other access requests, said request and verdict transmission circuits being connected to the bus, to the processor and to the priority resolution circuit.

According to another feature of the invention the priority resolution circuit comprises means for applying signals designating the arbitration means which will be active for the next access request to the bus to the priority resolution circuits of the other arbitration means.

According to another feature the arbitration verdict transmission circuit comprises means for recognizing whether the arbitration means designated as master of the bus corresponds to a processor which supplies an access request signal and for supplying to said processor, a signal indicating the acceptance of this request.

According to another feature the arbitration system also comprises supervision means connected to the priority resolution circuits by means of the bus for applying to said circuits an arbitration means change control signal if the arbitration verdict has not been given within a predetermined time.

According to another feature the supervision means comprise timing means, whose input is connected to the bus to receive the signals indicating that the other processors have made access requests, an output of said timing means supplying the arbitration means change signal to the priority resolution circuits if an arbitration verdict has not been given within a predetermined time.

According to another feature each arbitration means also comprises an interface connecting the processor and the arbitration verdict transmission circuit to the bus.

According to another feature the priority resolution circuit also comprises a priority resolution means incorporating at least one PROM memory for recording and managing the priorities of the arbitration means.

According to another feature the priority resolution circuit of each arbitration means also comprises a priority resolution means incorporating a fixed priority encoder for coding the access requests of the arbitration means operating in fixed priority and a cyclic priority encoder for encoding the priorities of the arbitration means operating in cyclic priority, said cyclic priority encoder incorporating at least one fixed priority encoder preceded by a circular scrambling network for the access requests and followed by an adder, which adds to the intermediate result the number of the processor and the value +1, the inputs of the fixed priority encoder and the cyclic priority encoder being connected to the outputs of a logic circuit, which respectively switches to the fixed priority and cyclic priority encoders, the requests of the arbitration means operating in fixed priority and the requests of the arbitration means operating in cyclic priority.

Finally, according to another feature, each arbitration means corresponding to the number of the processor requesting access to the bus is constructed in the form of an integrated circuit on a substrate enclosed in a standard case or box.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
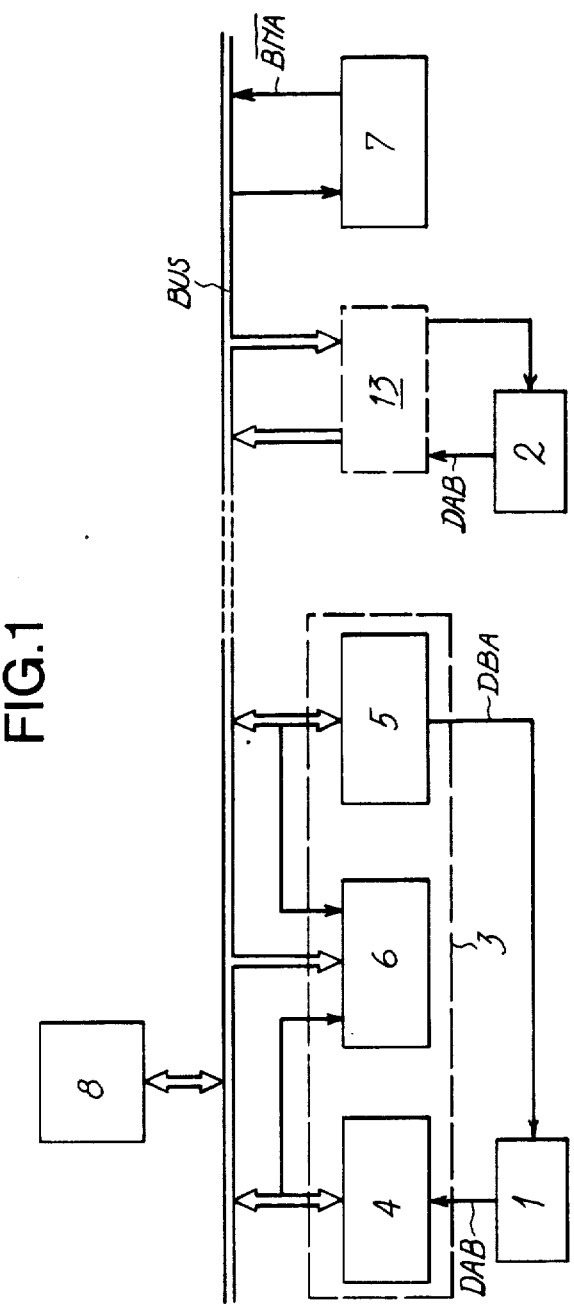
FIG. 1 a block diagram of a multiprocessor system using an arbitration means according to the invention.

FIG. 1 is a block diagram of the system according to the invention, which makes it possible to arbitrate access requests DAB from several processors 1, 2 to common resources 8 by means of a common communication bus BUS. Obviously the number of processors or microprocessors has been limited to the embodiment shown in the drawing, but the number can obviously be larger. The common resources 8 can be, for example, memories. This system comprises arbitration means 3, 13 regarding access request conflicts. These arbitration means are respectively connected to the processors and to the bus. Each of them comprises means 4, 5, for processing bus access requests DAB. The processing means are connected to the corresponding processors, as well as to an access priority resolution circuit 6, which is connected to the bus, to the processing means 4, 5 and to the processor 1. As will be shown in greater detail hereinafter, the priority resolution circuit is able to allocate fixed, cyclic sequential or mixed fixed and cyclic sequential priorities to the access requests DAB of the various processors. An accepted access request leads to the appearance of a signal DBA on an output of the arbitration means 3. The access request processing means comprise a bus access request circuit 4 and an arbitration verdict transmission circuit 5. These circuits will be described in greater detail hereinafter. FIG. 1 also shows supervision means 7, which will be described hereinafter, and which make it possible to apply a signal $\overline{\text{BNA}}$ to the arbitration means via the bus. This signal controls the change of arbitration means, if said means fails. This signal appears when the arbitration means, which is master of the bus, has not given an arbitration verdict within a predetermined time.

Figure 2:
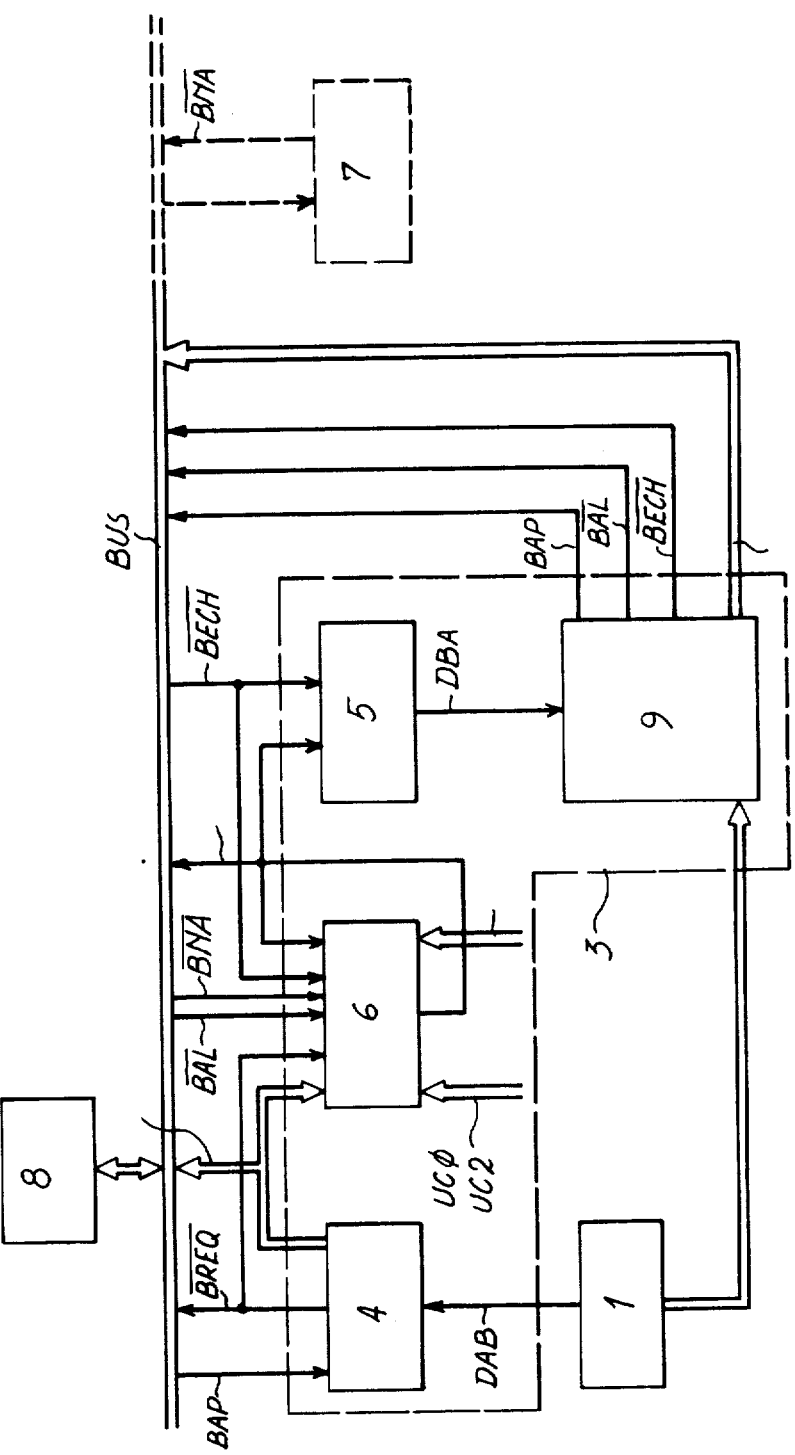
FIG. 2 a block diagram of an arbitration means connected to one of the processors in the system according to the invention.

FIG. 2 shows in more detailed manner one of the arbitration means 3 connected e.g. to processor 1 and to the bus in the system according to the invention. The access request processing means 4, 5 comprise a circuit 4 for access request by the processor to the bus. This circuit receives signal DAB indicating that the corresponding processor 1 wishes to have access to the bus. This circuit also receives a signal BAP indicating that arbitration is possible. The access request processing means also comprise a transmission circuit 5 of a signal DBA (accepted bus request) representing the arbitration verdict of the access request DAB of the corresponding processor, as a function of the priorities of the other access requests. Request circuit 4 and verdict transmission circuit 5 are connected to the bus, to the processor 1, as well as to the priority management circuit 6.

In general terms, the following signals are indicated in FIG. 1:

DAB: signal indicating an access request to the bus, said local signal being supplied by the processor requiring access to the bus in order e.g. to communicate with memory 8;

BAP: this signal indicates that an arbitration of the access to the bus is possible, said signal appearing on the common bus and informs all the arbitration means;

DBA: accepted bus request, this local signal informing an arbitration means that its request for access to the bus has been taken into consideration and accepted;

$\overline{\text{BREQ}}$: signal on bus indicating that there is an access request to be processed;

$\overline{\text{BECH}}$: exchange on bus, said signal remaining active during the performance of an exchange on the bus;

$\overline{\text{BNA}}$: signal on the bus, applying +1 to the priority resolution circuits of the arbitration means in order to designate a new arbitration means;

BM1 to BM3: three lines of the bus on which the signals form the encoded number of the processor having access to the bus;

$\overline{\text{BM4}}$: validation signal which is active if its logic level is 0 and validates signals BM1 to BM3;

$\overline{\text{BAL}}$: synchronization signal supplied by the processor having access to the bus with a certain delay on signal DBA.

As will be shown in greater detail hereinafter, the arbitration verdict transmission circuit 5, as well as processor 1, are connected to the common bus by means of an interface 9.

Each priority resolution circuit 6 comprises not shown means, which will be described in greater detail hereinafter and which make it possible to apply signals BM1, BM2, BM3, $\overline{\text{BM4}}$, designating the arbitration means which will be active for the next access request to the bus, to the priority resolution circuits of the other arbitration means.

The arbitration verdict transmission circuit 5 comprises means to be described in greater detail hereinafter and which enable the arbitration means designated as master of the common bus to recognize that it has this status. In this case, the verdict transmission signal 5 supplies to its processor a signal DBA indicating the acceptance of its access request. In FIG. 1 UCØ, UC1, UC2 are local signals, which are applied to the priority resolution circuit 6 for designating the number of the processor. Signals PØ, P1, P2 are local signals, which define the priority criteria (fixed, cyclic or mixed). Signals $\overline{\text{BAL}}$, BAP and $\overline{\text{BECH}}$ are service signals to be described in greater detail hereinafter and which are despatched to the bus by interface 9, when the arbitration verdict transmission circuit 5 has supplied a signal DBA indicating that the bus access request DAB has been accepted.

The device operates in the following way. When a processor, e.g. 1 wishes to have access to the bus, it applies a signal DAB to the bus access request circuit 4 of the corresponding arbitration means 3. The bus access request circuit 4 transmits signal DAB to the bus, when it is authorized by a signal BAP indicating that the arbitration of the bus is possible. The transmission of signal DAB to the bus takes place in the following way. A signal $\overline{\text{BREQ}}$, in the active state, reaches the bus, whilst one of the lines BA17 to BA 24 is positioned so as to indicate the number of the processor which is the candidate for access to the bus.

In the second embodiment, the priority resolution circuit 6, which involves the use of encoders and a scrambling circuit, stores the numbers of the processors which are candidates for access to the bus. These numbers are available, in the manner indicated hereinbefore, on one of the lines BA17 to BA 24. The priority resolution circuit arbitrates in accordance with a priority criterion (fixed and/or cyclic or both at once), defined by control signals P∅, P1, P2 on the bus access requests. It transmits to the bus, signals BM1, BM2, BM3 representing the arbitration verdict as well as the validation signal $\overline{BM4}$. These signals are also the signals received by the priority resolution circuit from other arbitration means. Thus, these signals only enable the priority management circuit to act if it has been designated as the active arbitration means at the end of the preceding data exchange on the bus. The signals $\overline{BREQ}$, $\overline{BAL}$ and $\overline{BECH}$ are service signals and synchronizations signals for the priority resolution circuit.

The main function of the arbitration verdict transmission circuit is to recognize whether or not its processor has a number corresponding to that of the future arbitration means which will be master of the bus and which is designated by signals BM1, BM2, BM3, $\overline{BM4}$. In the case where the number of the processor corresponds to the verdict BM1, BM2, BM3, the verdict transmission circuit supplies signal DBA indicating that the bus access request has been accepted. This signal is then applied to the interface 9 between the arbitration means and the bus in order to manage the said access.

The bus access request circuits 4 can be active in all the arbitration means simultaneously, because all the processors must be able to request access to the bus. The priority resolution circuit 6 is only active for the arbitration means which is at present master of the bus and which arbitrates on the next exchange on said bus. Finally, the arbitration verdict transmission circuit 5 is activated in the future arbitration means, which will be master of the bus and which has recognized at the exchange start on the bus that it will control the following exchange.

Figure 3:
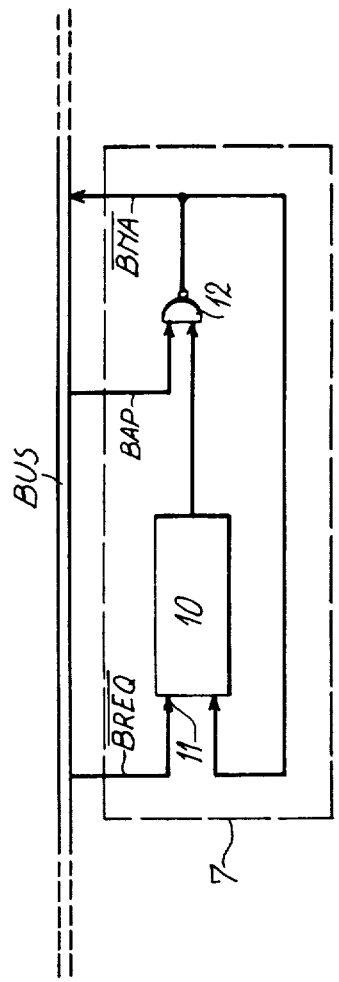
FIG. 3 a diagram of the supervision means of the system according to the invention.

FIG. 3 diagrammatically shows the supervision means 7 of the arbitration system according to the invention. These means are connected to the priority resolution circuit 6, via the bus, in order to apply to the said circuit a signal $\overline{BNA}$ controlling the change of arbitration means 3, if an arbitration verdict has not been given within a predetermined time. These supervision means comprise timing means 10 constituted by e.g. a monostable flip-flop, whereof one triggering input 11 receives the signal $\overline{BREQ}$ emanating from the bus access request circuit 4. The output of flip-flop 10 is connected to an input of an AND gate 12 with a reversed output, whilst another input of this gate receives the signal BAP from interface 9 across the bus. This signal indicates that the arbitration between the different bus access requests is possible. When at the end of a predetermined period, which is fixed by flip-flop 10, the verdict has not been given, so that signal $\overline{BREQ}$ remains active, the output of gate 12 supplies a signal $\overline{BNA}$. This signal is applied to the different system arbitration means, via the bus, in order to bring about the selection of a new arbitration circuit. Thus, this signal makes it possible to apply the value −1 to the priority resolution circuits of the arbitration means, in order to designate a new arbitration means.

Figure 4:
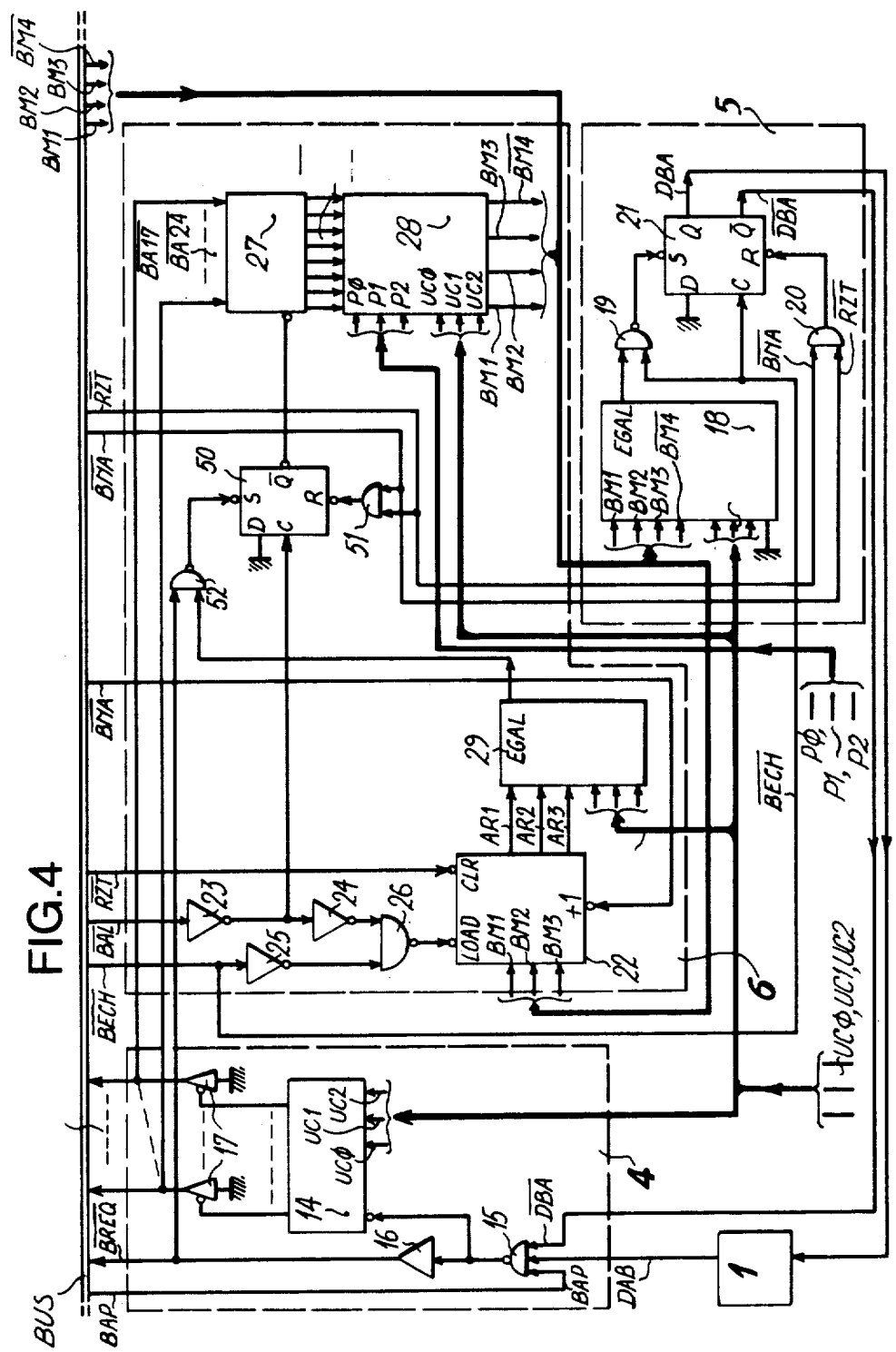
FIG. 4 a detailed diagram of the arbitration means of the system according to the invention in which, according to a first embodiment, a PROM memory is used for managing the priorities.

FIG. 4 shows in greater detail one of the access request arbitration means 3 which, in the first embodiment of the invention comprises a priority resolution PROM memory. In FIG. 3 it is possible to see the bus permitting the communication between one of the processors, such as processor 1, and the not shown resources, via one of the arbitration means. The latter are constituted, in the manner indicated hereinbefore, by an access request circuit 4, a verdict transmission circuit 5 and a priority resolution circuit 6 which, in this first embodiment of the invention, comprises a priority resolution means 28 constituted by a PROM.

The access request circuit 4 is constituted by a decoder 14 of the type 74LS138 making it possible to pass from a three bit code to an eight bit code. An AND gate 15, with an inverted output and three inputs, receives the signals BAP indicating that an arbitration is possible on the bus, DAB indicating that the processor requests access to the bus and $\overline{DBA}$ which is only supplied to the gate when the access request is accepted. The output of gate 15 is connected on the one hand to a validation input of decoder 14 and on the other hand to an input of an amplifier 16, whose output supplies a signal $\overline{BREQ}$. This signal indicates to the other arbitration means that at least one of the arbitration means has requested access to the bus. Decoder 14 also receives the binary signals UC∅, UC1, UC2 representing, in binary form, the number of the processor corresponding to the arbitration means requesting access to the communication bus. The outputs of decoder 14 are respectively connected to transmission lines BA17 to BA24 via amplifiers 17, in such a way that the possible access request of the arbitration means in question is transmitted to the bus by one of these communication lines corresponding to the number of the arbitration means in question (which is also the number of the processor corresponding to said arbitration means). Decoder 14 is only activated if there is an access request to bus DAB which is not being satisfied ($\overline{DBA}$) and if arbitration is authorized by signal BAP. In this case the active arbitration means is informed by signal $\overline{BREQ}$ that there is an access request which must be processed as soon as possible.

The arbitration verdict transmission circuit 5 comprises a four bit comparator 18 of the type 74LS85 receiving on the one hand number UC∅, UC1, UC2 from its corresponding processor and on the other hand binary signals BM1, BM2, BM3, $\overline{BM4}$. Signals BM1 to BM3 are supplied by three communication lines from the bus and indicate the number of the processor which will have access to the bus via the corresponding arbitration means. Signal $\overline{BM4}$ is also supplied by one of the communication lines which the bus and is a validation signal, which is active when its logic level is equal to 0 and which makes it possible to validate the signals BM1 to BM3. The verdict transmission logic circuit 5 also comprises an AND gate 19 with an inverted input, as well as an AND gate 20. The outputs of these gates are connected to the control inputs R, S of a flip-flop 21 of type RS. The inputs of gate 19 are connected on the one hand to an output of comparator 18, which supplies an equisignal EGAL and on the other hand to a transmission line from the communication bus, which supplies a signal $\overline{BECH}$ indicating that an exchange has taken place on the communication bus. Comparator 18 receives on the one hand signals BM1, BM2, BM3, BM4 and on the other the aforementioned signals UC∅, UC1 and UC2. The AND gate 20 receives signal $\overline{BNA}$ from the communication bus and this signal makes it possible to designate a new arbitration circuit by applying a signal equal to −1 to the priority management circuit. The AND gate 20 also receives a signal $\overline{RZT}$, which constitutes a total resetting signal for the system. Outputs Q and $\overline{Q}$ of flip-flop 21 are respectively connected to an input of AND gate 15 and a control input of interface 9, which is not shown in the drawing. These outputs respectively supply signal DBA indicating that the bus access request has been accepted and signal $\overline{DBA}$ making it possible, via AND gate 15, to drop signal $\overline{BREQ}$, whose request is being processed. The verdict transmission circuit 5 informs the arbitration means selected by the arbitration taking place that it can have access to the bus. At the end of data exchange on the communication bus, the flip-flop 21 is set to 0 in all the access request arbitration means via signal signal $\overline{BECH}$ supplied by the communication bus. Only the arbitration means designated by the arbitration taking place is recognized by the signal EGAL, which has forced flip-flop 21 to logic level 1 at the end of the exchange on the communication bus. The output of flip-flop 21 supplies signal DBA to interface 9, so that the latter can start carrying out an exchange on the bus.

The priority resolution circuit 6 comprises a parallel loading counter 22, which is well known in the art and receives signals BM1, BM2, BM3 indicating that the number, coded on three bits, of the next arbitration means. At its control inputs, it also receives a resetting signal $\overline{RZT}$, whilst its counting input receives signal $\overline{BNA}$. This counter is also connected by its input LOAD to a circuit comprising inverting switches 23, 24, 25 and the inverted output AND gate 26. This circuit receives the aforementioned signals $\overline{BECH}$ and $\overline{BAL}$. The outputs of the counter 22 are connected to the inputs of a comparator 29, which is identical to comparator 18. These outputs supply this comparator with signals AR1, AR2, AR3 representing the number coded on three bits of the arbitration means designated to arbitrate on the new exchange. This comparator also receives on three other inputs, the number UC∅, UC1, UC2 of the processor on which it is located. In principle, it is the arbitration means whose processor has access to the communication bus, which is designated to arbitrate on the following exchange. Counter 22 ensures the storage of the number of the designated arbitration means at each change commencement. The latter takes place when signal $\overline{BECH}$ is at logic level 0. On initialization by signal $\overline{RZT}$ counter 22 is forced to 0. In the case of the failure of the arbitration means, the supervision means described hereinbefore supplies signal $\overline{BNA}$. This signal modifies signal AR1, AR2, AR3 entering comparator 29, so as to control the designation of a new arbitration means. The comparator makes it possible to only activate the arbitration means, whose number UC∅, UC1, UC2 is equal to the number coded by AR1, AR2, AR3. The priority resolution circuit also comprises a type RS flip-flop 50, whose control inputs R and S are respectively connected to the outputs of AND gates 51 and 52. Gate 51 respectively receives at its inputs, the aforementioned signals $\overline{BNA}$ and $\overline{RZT}$. Gate 52 receives the signal $\overline{BREQ}$ indicating that there is an access request to the communication bus and output signal EGAL of comparator 29. Flip-flop 50 is only active for the arbitration means designated by signals AR1, AR2, AR3. This flip-flop is used for controlling a locking flip-flop means 27, which receives at its input signals BA17 to BA24 indicating, in the manner shown hereinbefore, the numbers of the processors which have requested access to the communication bus. Flip-flop 27 is transparent, when the signal $\overline{BREQ}$ supplied thereto by flip-flop 25 is at logic level 1. The locking flip-flop stores requests $\overline{BA17}$ to $\overline{BA\,24}$, on the falling front of signal BREQ supplied by the output $\overline{Q}$ of flip-flop 50. The locking flip-flop 27 becomes transparent again for the signals received at its inputs, when flip-flop 50 is activated on the falling front of signal $\overline{BAL}$.

Finally the priority management circuit also comprises a priority resolution means 28 which, in the first embodiment of the system according to the invention, is constituted by a PROM memory in which the priorities of the processors are coded. This memory supplies at the output a priority verdict, which is a function of the requests reaching its inputs. Means 28 receives signals L∅, L1, . . . L7 from locking flip-flop 27 at its inputs. This priority management means supplies at the output, signals BM1, BM2, BM3, $\overline{BM4}$ making it possible to indicate the coded number of the arbitration means, which can have access to the communication bus.

Figure 5:
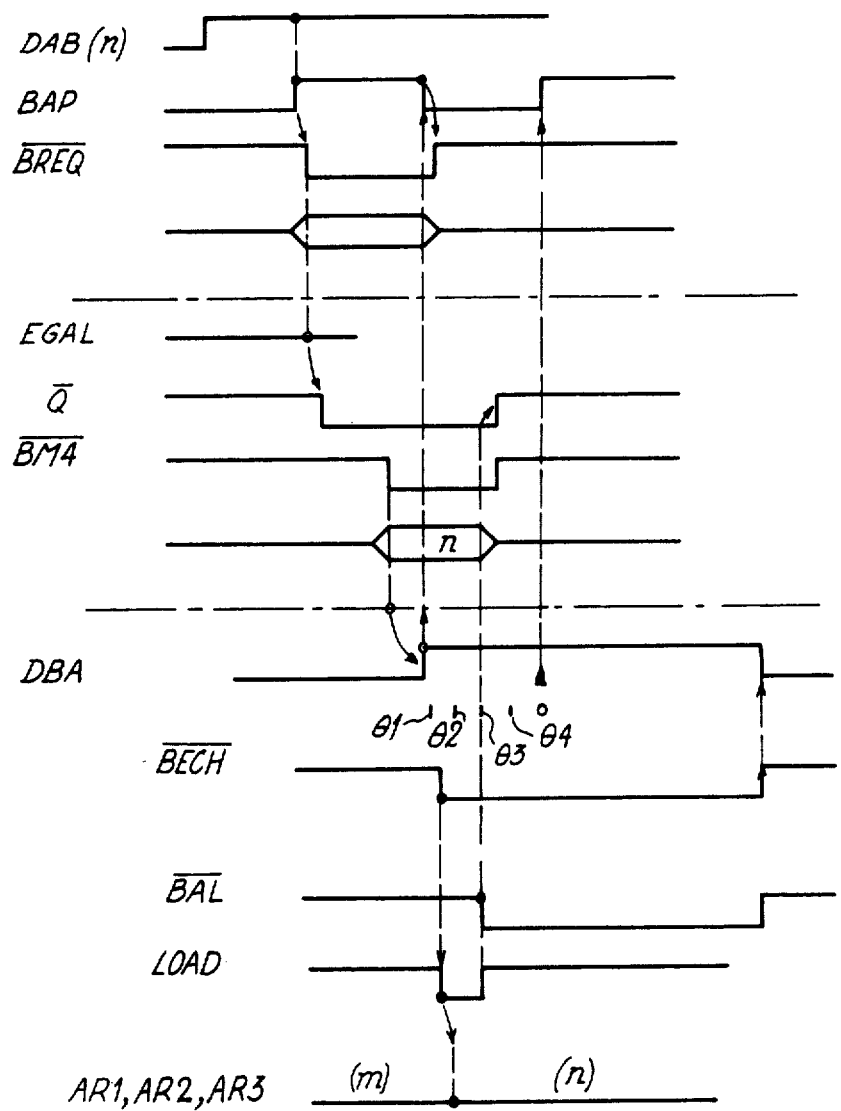
FIG. 5 a chronogram of the main signals involved in the system according to the invention.

FIG. 5 is a chronogram of the main signals involved in the system according to the invention. It is possible to see the various signals and their interconnection, during the arbitration of a communication bus access request, which comes from the processor and the arbitration means of number n. It is also assumed that the preceding exchange has been carried out by processor m, which implies that it is arbitration means m which will arbitrate on the access request which will be described in detail. On the chronogram, the communication bus access request made to the arbitration means n by its processor, is represented by signal DAB. The passage to logic level 1 of signal BAP (arbitration possible) on the one hand causes the signal $\overline{BREQ}$ to be brought into the active state and on the other hand leads to the activation of one of the communication lines BA17 to BA24, which corresponds to number n. All these actions are carried out by the access request circuit of arbitration means n.

On the priority resolution circuit of arbitration means m, there is equality (signal EGAL) between signals AR1, AR2, AR3 and UC∅, UC1, UC2, said signals representing two words of three bits, corresponding to value m. Signal EGAL is available at the output of comparator 29 in FIG. 4 and as this signal is equal to 1, the falling front of signal $\overline{BREQ}$ passes through gate 52 and brings about, via output $\overline{Q}$ of flip-flop 50, the locking of signals $\overline{BA17}$ to $\overline{BA24}$. These latter signals reach the input of locking flip-flop 27. The priority resolution means 28 then gives a verdict represented by signals BM1, BM2, BM3, said verdict being validated by signal $\overline{BM4}$. If there is no other access request to the communication bus, this verdict is equal to the number n of the arbitration means requesting access to the communication bus.

The arbitration verdict tranmission circuit of arbitration means n will then recognize itself as such and will supply signal DBA to its processor across interface 9 (FIG. 2). This signal DBA brings signal BAP into the inactive state (logic level 0) and controls the starting of a time base (θ1, θ2, θ3, θ4) to arbitration means n. This time base is not shown in the drawings for ease of representation. It makes it possible to calibrate all signals from the arbitration means and in particular signals $\overline{BECH}$, BA 17 to BA 24 and $\overline{BAL}$. These signals $\overline{BECH}$ and $\overline{BAL}$ created by the time base are used for resetting signal $\overline{Q}$ of the flip-flop 50 to logic level 1 (transparent state of locking flip-flop 27) and for producing a negative pulse $\overline{LOAD}$ (gate 26, FIG. 4) making it possible to load counter 22 by the value of the number of the future arbitration means n.

Figure 6:
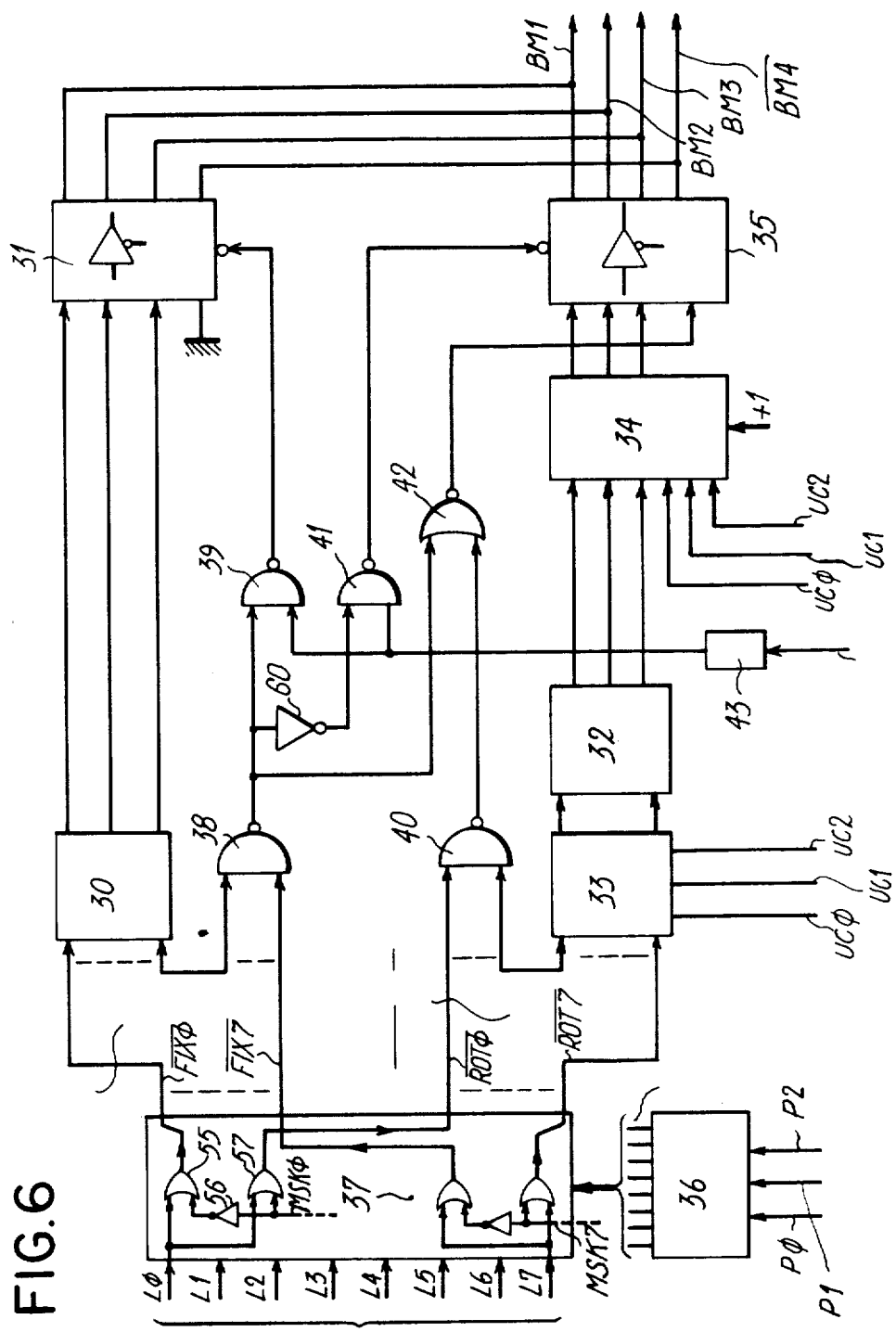
FIG. 6 a diagram of the priority resolution circuit which, in a second embodiment of the system according to the invention, makes it possible to manage and code the numbers of the processors requesting access to the bus, on the basis of a fixed priority, a cyclic priority or a combination of these two priority types.

FIG. 6 is a detailed diagram of priority resolution means 28 (FIG. 4) in a second embodiment of the system according to the invention. The PROM memory of the first embodiment is in this case replaced by a priority resolution means comprising a fixed priority encoder 30 of type LS148. This management means also comprises a cyclic priority encoder, constituted by another fixed priority encoder 32, preceded by a circular scrambling network 33 of access signals $\overline{ROT0}$ to $\overline{ROT7}$ and followed by an dder 34 adding the value UC0, UC1, UC2+1, to the intermediate result. It also comprises a switching control logic circuit 36, which controls a switching logic circuit 37. Switching circuit 37 comprises OR gates 55, which respectively receive at their first input signals $\overline{L0}, \ldots \overline{L7}$ from the locking flip-flop 27. The switching control signals MSK0, . . . MSK7 supplied by control circuit 36 are respectively applied to the second input of OR gates 55 via inverting switches 56, said signals will be described in greater detail hereinafter. The switching circuit 37 also comprises OR gates 57, which respectively receive at their inputs, signals L0, L1, . . . L7 and MSK0, MSK1, . . . MSK7. The outputs of the switching logic circuit 37 are connected to the inputs of encoder 30, circular scrambling network 33 and the inputs of a logic circuit incorporating AND gates 38, 39, 40, 41 having inverted outputs. The output of gate 39 is connected to the control input of a three-state gate 31, whilst the output of a gate 41 is connected to the control input of a three-state gate 35. The outputs of gates 38 and 40 are respectively connected to the inputs of an OR gate 42, whose inverted output is connected to an input of the three-state gate 35. One of the inputs of AND gate 41 receives signals $\overline{Q}$ from flip-flop 50 (FIG. 4). This signal is applied to the input of AND gate 41 through delay line 43.

The three-state gates 31 and 33 are of type 74LS125. They make it possible to carry out a multiplexing of the signals received at their inputs and coming respectively from the fixed priority encoder 31 and adder 34 forming part of the cyclic priority encoder 33, 32, 34. The circuit constituted by gates 38, 39, 41 and inverting switch 60 is in fact a multiplexing control circuit of the fixed priorities and cyclic priorities, because gates 39 and 41 still supply opposite control signals.

Input signals $\overline{L0}, \overline{L1}, \ldots \overline{L7}$ applied to the inputs of the switching logic circuit 37 come from the output of locking flip-flop 27. The management input supplies, in the manner shown hereinafter, signals BM1, BM2, BM3 designating the number of the arbitraton means for having access to the bus. This management means also supplies signal $\overline{BM4}$, making it possible to validate the arbitration. The system according to the invention makes it possible to manage fixed and cyclic priorities at the same time, signals P0, P1, P2 being signals making it possible to programme these priorities. In binary coded form, signals P0, P1, P2 represent the number n of arbitration means which it is wished to process in fixed priority. It is assumed that the arbitration means functioning in fixed priority carry numbers 0, 1, . . . , N−1, whilst the cyclic priority arbitration means carry numbers N, N+1, . . . , 7 (in the case where there are e.g. 8 arbitration means on the communication bus).

It is assumed in exemplified manner that the fixed priority arbitration means have a higher priority than the cyclic priority arbitration means.

Switching controls represented by signals MSK0, MSK1, . . . MSK7 are obtained from signals P0, P1, P2 and this makes it possible to switch signals $\overline{L0}, \overline{L1}, \ldots \overline{L7}$ to the fixed priority encoder or to the cyclic priority encoder, as a function of the value of MSK0, to MSK7. The switching control signals MSK0 to MSK7 act in the following way. If P0, P1, P2 have been coded to represent the value N, thus wishing the arbitration means 0, 1 . . . N−1 to be processed in fixed priority and arbitration means N, N+1, . . . , 7 in cyclic priority, signals MSK0, MSK1, . . . MSK(N−1) will ensure the transmission of L0, L1, . . . , L(N−1) in the fixed priority encoder 30 (signals FIX0, FIX1, . . . FIX(N−1)). In addition they will bring into the inactive state signals $\overline{ROT0}, \overline{ROT1}, \ldots, \overline{ROT(N-1)}$, which must not be considered by the cyclic priority encoder. In the same way MSKN, . . . MSK7 render inactive $\overline{FIXN}, \ldots \overline{FIX7}$ on the fixed priority encoder and transmit $\overline{LN} \ldots \overline{L7}$ to the cyclic priority encoder leading to signals $\overline{ROTN}$ to $\overline{ROT7}$.

The possible activity of the fixed priority encoder is detected by gate 38 and inhibits the result of the cyclic priority encoder by forcing gate 35 into the third state. If the fixed priority encoder is inactive, gate 38 forces gate 31 into the third state and, by gate 41, authorizes the cyclic priority encoder to give the verdict because, in the case of normal operation, at least one of the two encoders is active. If both encoders are inactive, the cyclic priority encoder supplies signal $\overline{BM4}$ at logic level 1. This case results e.g. from an unwanted signal or run-out. An access request to the bus is made, but there is no signal active on the locking flip-flop.

It should be noted that a time lag is introduced on the output signal of the flip-flop 24 enabling encoders 30, 32 to supply a stable result before one of the two three-state gates 31, 35 has opened.

The switching logic circuit 37 receives signals $\overline{L0}$ to $\overline{L7}$, which are active when their logic level is equal to 0. On the basis of the explanations provided hereinbefore, signals MSK0 to MSK7 define a mask, which performs the following logic operations for n=0 to 7:

$$ROTn = MSKn + Ln$$

$$FIXn = \overline{MSKn} + Ln$$

The signals ROT0 to ROT7 and FIX0 to FIX7 are respectively applied to the fixed and cyclic priority encoders 30, 32.

Signals MSK0 to MSK7 supplied by the switching control logic circuit 36 are in accordance with the following equations:

$$MSK0 = P0 + P1 + P2$$

$$MSK1 = P1 + P2$$

$$MSK2 = P2 + P1.P0$$

$$MSK3 = P2$$

$$MSK4 = P2(P1 + P0)$$

$$MSK5 = P2.P1$$

$$MSK6 = MSK7 = P2.P1.P0.$$

In these equations, P0 is the minimum significance of the code.

On wishing to have, for example, three fixed priority arbitration means, there are the equations:

$$P2.P1.P0 = 011$$

and from this is deduced:

MSK7 ... MSK∅=00000111

The cyclic priority encoder operates in accordance with the following principle. If the active encoder is that of arbitration means 3 coded by UC∅, UC1, UC2, the highest cyclic priority is then allocated to arbitration means 4, whose possible access request to the bus is supplied, due to the scrambling network 33, to fixed encoder 32 with the highest priority. The scrambling of the other access requests is then deduced by circular permutation. If arbitration means 4 requests an access to the bus, the output of the fixed priority encoder will be that having number 7 (highest priority request). As encoder 32 supplies active signals at the zero logic level, the output corresponding to the highest priority 7 will be 0. The addition of this result, the number of the arbitration means 3 and +1, realized by 34, will give number 4, which consequently designates arbitration means 4 as the future bus master.

Figure 7:
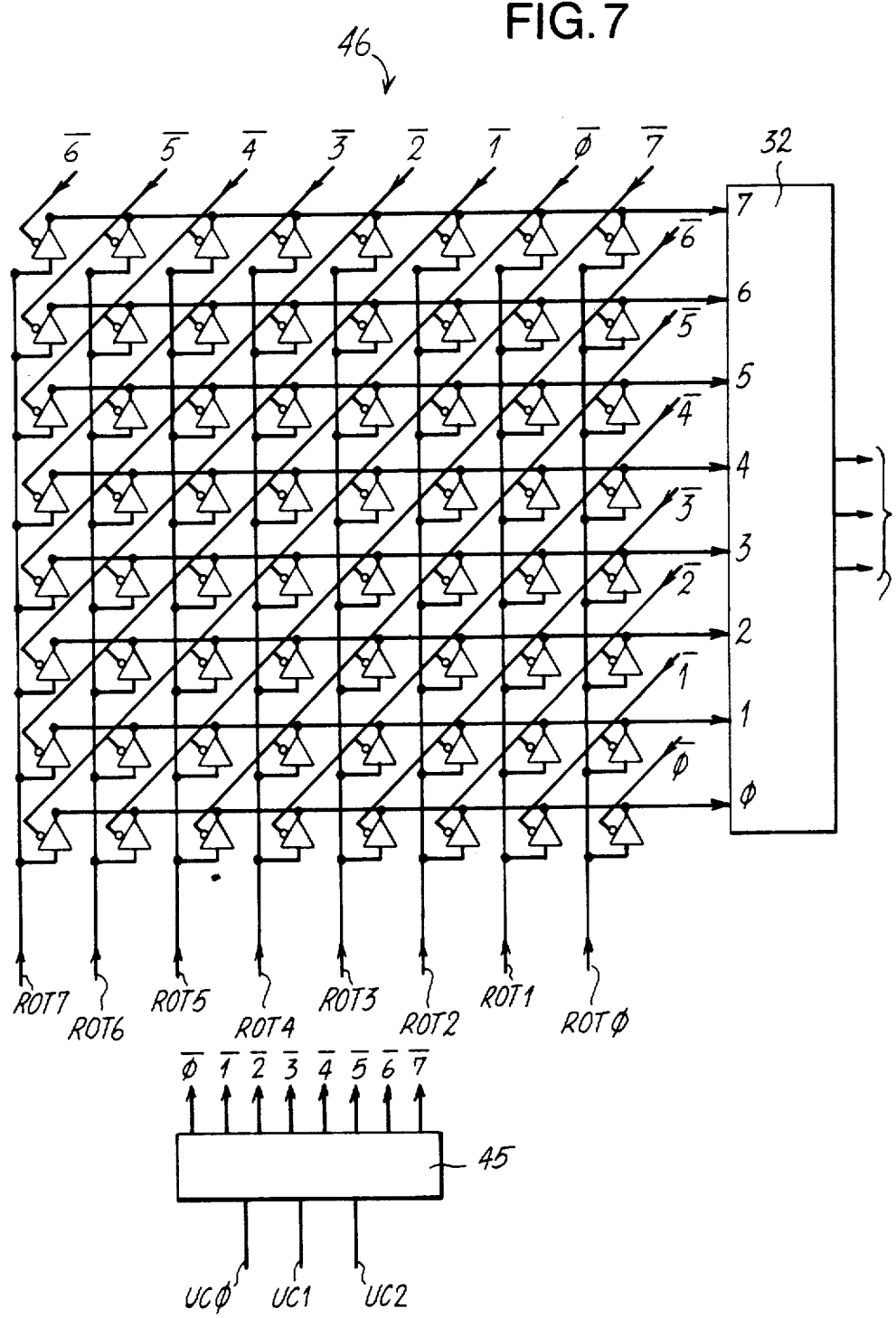
FIG. 7 a detailed representation of a circular scrambling network involved in the circuit of FIG. 6 and which is used in the construction of a cyclic priority encoder.

FIG. 7 shows a detail of the scrambling network 33 of the cyclic priority encoder. As stated hereinbefore, this encoder is constituted by a fixed priority encoder 32, preceded by a circular scrambling network 33 and provided with an adder 34 which adds, to the intermediate result, the number of the arbitration means UC∅, UC1, UC2, increased by one unit. The circular scrambling network comprises a decoder of type LS138 having three inputs and eight outputs. This decoder makes it possible to select one of the diagonals $\overline{0}, \overline{1}, \ldots \overline{7}$ of the scrambling network 46. All the other diagonals are then inactive and the three-state gates 59 which they control are in the third state. These gates then have no action on inputs 0,1,2, 3, . . . , 7 of fixed priority encoder 32. Thus, for each input of encoder 32, there is only a single three-state gate which is activated. The scrambling network then despatches on the highest priority level of fixed priority encoder 32 (level 7) the request $\overline{ROTN}$ of the processor having number N corresponding to UC∅, UC1, UC2 +1 by means of the three-state gate activated by the diagonal of number UC∅, UC1, UC2.

The arbitration system described hereinbefore makes it possible to arbitrate on conflicts of access to a bus on which can be interconnected up to eight arbitration means. The bus is independent of the processors or microprocessors and may or may not be multiplexed. The arbitration performed is decentralized, parallel and asynchronous and is performed in a time close to 100 nanoseconds. The arbitration means can be integrated in a single case for the second embodiment of the invention, because all the circuits are standard. In the case of the first embodiment of the invention (coding of priorities with PROM), integration would also be possible, but this would be in a case not having a standard number of pins, because here the programming of the PROM requires supplementary pins.

It is obvious that in the system described hereinbefore, the means used could be replaced by equivalent means without passing beyond the scope of the invention.

What is claimed is:

1. An arbitration system for access requests to several processors having common resources by means of a common bus, comprising for each processor an arbitration means for access request conflicts, said arbitration means comprising: means for processing access requests connected to the bus and to the processor; and a resolution circuit for access priorities connected to the bus, to the access request processing means and to the processor, for allocating to the access requests fixed priorities, cyclic priorities or mixed fixed and cyclic priorities; said means for processing the access requests comprising a bus access request circuit receiving a signal indicating an access request of the corresponding processor to the arbitration means in question, as well as a signal indicating whether the other processors have made an access request; and a circuit for transmitting a signal representing the access request arbitration verdict of the corresponding processor, as a function of the priorities of the other access requests; said request and verdict transmission circuits being connected to the bus, to the processor and to the priority resolution circuit.

2. An arbitration system according to claim 1, wherein the priority resolution circuit comprises means for applying signals designating the arbitration means which will be active for the next access request to the bus to the priority resolution circuits of the other arbitration means.

3. An arbitration system according to claim 2, wherein the arbitration verdict transmission circuit comprises means for recognizing whether the arbitration means designated as master of the bus corresponds to a processor which supplies an access request signal and for supplying to said processor, a signal indicating the acceptance of this request.

4. An arbitration system according to claim 3, wherein the arbitration system also comprises supervision means connected to the priority resolution circuits by means of the bus for applying to said circuits an arbitration means change control signal if the arbitration verdict has not been given within a predetermined time.

5. An arbitration system according to claim 3, wherein the supervision means comprise timing means, whose input is connected to the bus to receive the signals indicating that the other processors have made access requests, an output of said timing means supplying the arbitration means change signal to the priority resolution circuits if an arbitration verdict has not been given within a predetermined time.

6. An arbitration system according to claim 1, wherein each arbitration means also comprises an interface connecting the processor and the arbitration verdict transmission circuit to the bus.

7. An arbitration system according to claim 3, wherein the priority resolution circuit also comprises a priority resolution means incorporating at least one PROM memory for recording and managing the priorities of the arbitration means.

8. An arbitration system according to claim 3, wherein the priority resolution circuit of each arbitration means also comprises a priority resolution means incorporating a fixed priority encoder for coding the access requests of the arbitration means operating in fixed priority and a cyclic priority encoder for encoding the priorities of the arbitration means operating in cyclic priority, said cyclic priority encoder incorporating at least one fixed priority encoder preceded by a circular scrambling network for the access requests and followed by an adder, which adds to the intermediate result the number of the processor and the value +1, the inputs of the fixed priority encoder and the cyclic priority encoder being connected to the outputs of a logic circuit, which respectively switches to the fixed priority and cyclic priority encoders, the requests of the arbitration means operating in fixed priority and the requests of the arbitration means operating in cyclic priority.

9. An arbitration system according to claim 8, wherein each arbitration means corresponding to the number of the processor requesting access to the bus is constructed in the form of an integrated circuit on a substrate enclosed in a standard case or box.

* * * * *